(12) United States Patent
Kamiya et al.

(10) Patent No.: US 7,896,129 B2
(45) Date of Patent: Mar. 1, 2011

(54) SUB-MUFFLER

(75) Inventors: Sumio Kamiya, Toyota (JP); Kazutoshi Wakatsuki, Toyota (JP); Hironori Sasaki, Tsushima (JP); Noriaki Nakagawa, Kasugai (JP)

(73) Assignees: Toyota Jidosha Kabushiki Kaisha, Toyota-shi, Aichi-ken (JP); Nakagawa Sangyo Co., Ltd., Inuyama-shi, Aichi-ken (JP)

( * ) Notice: Subject to any disclaimer, the term of this patent is extended or adjusted under 35 U.S.C. 154(b) by 77 days.

(21) Appl. No.: 12/094,902

(22) PCT Filed: Nov. 24, 2006

(86) PCT No.: PCT/JP2006/324037
§ 371 (c)(1),
(2), (4) Date: Jun. 4, 2009

(87) PCT Pub. No.: WO2007/061133
PCT Pub. Date: May 31, 2007

(65) Prior Publication Data
US 2009/0242324 A1    Oct. 1, 2009

(30) Foreign Application Priority Data

Nov. 24, 2005 (JP) ................................ 2005-339230

(51) Int. Cl.
*F01N 1/10* (2006.01)
*F01N 13/14* (2010.01)
*F01N 13/16* (2010.01)

(52) U.S. Cl. ........................................ 181/252; 181/256
(58) Field of Classification Search .................. 181/252, 181/256; 501/36
See application file for complete search history.

(56) References Cited

U.S. PATENT DOCUMENTS 3,310,412 A    3/1967    Hofstadt et al.

(Continued)

FOREIGN PATENT DOCUMENTS

DE    76 16 079    9/1976

(Continued)

OTHER PUBLICATIONS

Van De Velde, K. et al., "Basalt Fibres as Reinforcement for Composites," Internet Article, XP002398911, http://www.basaltex.com/logos/basalt%20fibres.pdf, 2 sheets, (Feb. 13, 2005).

(Continued)

*Primary Examiner* — Elvin G Enad
*Assistant Examiner* — Jeremy Luks
(74) *Attorney, Agent, or Firm* — Finnegan, Henderson, Farabow, Garrett & Dunner, LLP (57) ABSTRACT

Provided is a sub-muffler which needs no heat resistant material such as SUS, and which can keep its durability and sound absorbing performance even when the sub-muffler is exposed to various corrosive components in the exhaust gas. At the same time, accomplished is a low-cost manufacture, which is a challenge that sub-mufflers and sound absorbing materials commonly face. Disclosed is a sub-muffler in which a perforated exhaust pipe is arranged, and caps and an out pipe are arranged outside the perforated pipe. Sound absorbing materials are filled in the space between the perforated exhaust pipe, and the caps and the out pipe. The sub-muffler is characterized in that, among the sound absorbing materials, at least part of the sound absorbing material of the perforated pipe side is a basalt fiber for high temperature.

15 Claims, 5 Drawing Sheets

U.S. PATENT DOCUMENTS

| | | | |
|---|---|---|---|
| 5,892,186 A * | 4/1999 | Flugger | 181/252 |
| 5,926,954 A | 7/1999 | Wolf et al. | |
| 6,148,955 A * | 11/2000 | Wolf et al. | 181/252 |
| 6,457,555 B1 * | 10/2002 | Saughnessy | 181/294 |
| 6,543,576 B1 * | 4/2003 | Cofer et al. | 181/252 |
| 6,809,050 B1 * | 10/2004 | McGinnis | 501/35 |
| 6,857,502 B2 * | 2/2005 | Naito | 181/252 |
| 2005/0051383 A1 * | 3/2005 | Harwood | 181/256 |
| 2005/0167192 A1 | 8/2005 | Simon | |
| 2007/0251595 A1 * | 11/2007 | Chen | 139/420 C |
| 2009/0199521 A1 * | 8/2009 | Witschen et al. | 55/385.1 |

FOREIGN PATENT DOCUMENTS

| | | |
|---|---|---|
| EP | 1 217 184 A1 | 6/2002 |
| EP | 1 559 877 A1 | 8/2005 |
| JP | 10-77823 | 3/1998 |
| JP | 2000-356119 | 12/2000 |
| JP | 2002-4833 | 1/2002 |
| JP | 2003-206720 | 7/2003 |
| JP | 2006-335629 | 12/2006 |
| RU | 2 225 374 | 3/2004 |

OTHER PUBLICATIONS

Yan-Quanying et al., "Experimental Research and Analysis on the Viscosity of Basalt Melt and Basalt Additives at High Temperatures," Glass Technol., vol. 42, No. 4/5, pp. 134-138, (Aug./Oct. 2001).

* cited by examiner

SUB-MUFFLER

This application claims priority to PCT International Application No. PCT/JP2006/324037, filed Nov. 24, 2006, now International Publication No. WO 2007/061133, which claims the benefit of Japanese Application No, 2005-339230, filed Nov. 24, 2005, all of which are incorporated herein by reference in their entirety for all purposes.

BACKGROUND OF THE INVENTION

1. Field of the Invention

The present Invention relates to a sub-muffler utilizing basalt fiber, which has an excellent sound absorbing property and an excellent heat resistance as a sound absorbing material.

2. Description of the Related Art

An automobile muffler is used as a member to absorb exhaust sound. Fiberglass is used today as a sound absorbing material of a muffler. Recently, the necessity of energy saving and the tighter control on exhaust emission have brought about a rise in the automobile engine temperature, which is accompanied by a rise in the exhaust gas temperature at the muffler portion up to 800° C. or higher. For this reason, there is an urgent need to develop a sound absorbing material for mufflers with a higher heat resistance (capable of dealing with a temperature range from 750° C. to 900° C.).

For example, exposure to a high-temperature (up to 800° C.) gas, emitted from the exhaust system of various types of engine, brings about a decrease in the durability and the sound absorbing property of a sub-muffler equipped with a commercially available fiberglass mainly composed of a synthetic raw material of $SiO_2$—$Al_2O_3$—CaO and the like (hereinafter referred to as a sub-muffler (1)). The reason for this decrease is as follows. Fibers in the commercially available fiberglass mainly composed of a synthetic raw material of $SiO_2$, $Al_2O_3$ and the like stick together when the fibers are exposed to an exhaust gas of a temperature up to 800° C. This results in an increase in the apparent filament diameter of the fiberglass, and the increase in the diameter, in turn, causes a decrease in the flexibility of the fiberglass as a sound absorbing material. Eventually, the sound absorbing property of such fiberglass decreases.

In addition, exposure to a high-temperature (up to 830° C.) gas, emitted from the exhaust system of various types of engine, brings about a decrease in the durability and the sound absorbing property of a sub-muffler equipped with a commercially available fiberglass mainly composed of synthetic raw materials of $SiO_2$—$Al_2O_3$—MgO and the like (hereinafter referred to as a sub-muffler (2)). The reason for this decrease is as follows. The commercially available fiberglass mainly composed of synthetic raw materials of $SiO_2$, $Al_2O_3$ MgO and the like is crystallized by an exhaust gas at a temperature up to 830° C., which results in the loss of the flexibility of the fiber.

Furthermore, a temperature of 650° C. or higher of the exhaust system of various types of engine brings about a decrease in the durability and the sound absorbing property of a sub-muffler equipped with a fiberglass of synthetic raw materials other than those used in the sub-mufflers (1) and (2), specifically a fiberglass of synthetic raw materials of $SiO_2$—$Al_2O_3$—CaO—$Na_2O$ system, $SiO_2$—CaO—$Na_2O$ system, $SiO_2$—$Na_2O$ system and $SiO_2$—$K_2O$ system (hereinafter referred to as a sub-muffler (3)). The reason for this decrease is as follows. Since these types of fiberglass contain a considerable amount of alkali metal oxides such as CaO, $Na_2O$ and $K_2O$, exposure to an exhaust gas at 650° C. or higher facilitates crystallization, sticking and corrosion by the acid components of various types in the exhaust gas.

Besides, the manufacturing cost of the sub-muffler (2) is high, specifically, at the level of several thousand yen per kilogram. The reason is as follows. In manufacturing the fiberglass of $SiO_2$, $Al_2O_3$, MgO and the like from these oxides, firstly each of the oxides is purified and separated from the corresponding various raw materials to obtain the synthetic raw material. Secondly, these components are ground, and then the resultant powders are mixed. Subsequently, the mixture is melted at a high temperature, and thus the molten materials are formed into fiber.

Each of the sub-mufflers (1) and (3) has a complicated manufacturing process and has a heavy weight in order to keep the fiberglass at a lower temperature. This is because two steps are required for this purpose, such as a first step of winding SUS wool around the outer circumference of the inner pipe and a second step of winding a sound absorbing material of fiberglass around the circumference thereof.

In addition, the cost in the recycling process of the sub-mufflers (1) and (3) is, high. The burning of the fiberglass used in the sub-mufflers (1) and (3) in an incineration generates oxides each of which has a low melting point. The corrosion of refractory lining of the incinerator caused by the oxides decreases the durability of the incinerator. This requires an increase in the capital investment in plant and machinery.

Furthermore, use of the sub-mufflers (1), (2) and (3) has a difficulty in reducing the environmental burden as seen from the view point of Life Cycle Assessment (LCA). The manufacture of fiberglasses used respectively in the sub-mufflers (1), (2) and (3) generates more $CO_2$ than otherwise, because they are produced by, firstly, synthesizing their own component oxides, secondly mixing the powders of the oxides in a certain predetermined composition, and then melting the respective mixtures.

In contrast, basalt continuous fiber made from a raw material of natural basalt raw stone is significantly less expensive than conventional continuous fiberglass. The basalt continuous fiber, however, has the following problem when used at a high temperature ranging from approximately 750° C. to approximately 900° C. A crystalline phase is generated from glass component, and this leads to problems such as the loss of flexibility and the separation at the boundary between the crystalline layer and the glass layer.

The facts that have been described thus far leads to the unavailability of fiberglass for absorbing sound, nor materials for heat-insulation parts for vehicles, which has a satisfactorily high heat resistance and a satisfactorily high durability, and which can be manufactured at a low cost, at the same time.

JP Patent Publication (Kokai) No. 10-77823 A discloses an invention of a muffler in which a fiber as a sound absorbing material is provided by winding around an exhaust pipe. In the disclosed invention, a continuous fiber is provided by winding around the outer circumference of the exhaust pipe where vent-holes are bored. The continuous fiber is provided by winding around at the positions where the vent-holes are located. The continuous fiber is provided by winding not in a state of being woven, but in a state of being layered, for the purposes of forming the fiberglass layers inexpensively and preventing the layers from clogging by oily substances in the exhaust gas. In this disclosure, such fibers as a fiberglass, a fiber made from basalt stone and a ceramic fiber made from high-purity silica, are cited as examples of the continuous fiber. Nevertheless, in the above disclosure, there is no indication at all, as to what kind of basalt fiber is used.

SUMMARY OF THE INVENTION

The inventors of the present invention have found out that the problems were derived from the following causes (1) to (4).

(1) A conventional fiberglass loses its flexibility when it is exposed to a high-temperature exhaust gas. This is because the exposure provokes the crystallization of part of the fiberglass from a perfect glass phase, and because it also provokes the generation of crystalline phase of Ca—Si—O system, which has a low melting point. The generation of crystalline phase provokes the sticking and hardening of fibers to one another to make the apparent filament diameter multiplied by several times to the diameter of a single filament. The crystallization and the generation of crystalline phase hamper the flexibility of the fiberglass.

(2) A conventional fiberglass loses its flexibility when it is exposed to a high-temperature exhaust gas for another reason. Even when no sticking occurs in the fiberglass, the fiberglass made completely of glass phase is turned into one made only of crystalline phase. This hampers the flexibility of the fiberglass.

(3) The manufacturing cost of a commercially available fiberglass is high because of the following reasons. In manufacturing the fiberglass, raw materials of oxides to be glass network formers and glass network modifiers are mixed to be in a certain predetermined composition, and then the mixture is melted at a high temperature. As a result, raw material cost becomes high, a step of mixing powders is needed, and a high temperature is required for melting the raw materials. All of these result in an increase in manufacturing cost.

(4) A conventional basalt fiber can be manufactured at a lower manufacturing cost than a commercially available fiberglass because the basalt fiber is made from a natural raw material. In addition, the raw stone (B) (the basalt raw stone for low temperature (B)) has a low $SiO_2$ content and, for this reason, its molten material has a low viscosity at a high temperature. As a result, it is possible to fabricate a continuous fiber with a filament diameter of 20 μm or smaller. The continuous fiber, however, does not have a sufficient heat resistance because the glass phase crystallizes at 750° C. or higher.

What has been said above suggests the following. It is necessary that network formers and glass modifiers should be formed and maintained in the basalt raw stone (B), and that the crystallization and the sticking of the basalt fiber should be curbed. It is also necessary that the heat resistance of the basalt fiber should be significantly improved from a conventional level of 750° C. up to a range between 750° C. and 900° C. At the same time, it is necessary that a significant reduction in the manufacturing cost should be accomplished in comparison to the conventional basalt fibers.

The present invention relates to a basalt fiber sound absorbing material for a sub-muffler of a gasoline engine, a diesel engine, an engine for a flex fuel vehicle (FFV, for example, gasoline/ethanol vehicle), and an engine for a hybrid vehicle (HV). An object of the present invention is maintaining the durability and the sound absorbing performance of a sub-muffler even when the material is exposed to a high-temperature exhaust gas at 650° C. to 900° C., or to a corrosive gas constituents such as HC, $NO_x$, $SO_x$, formaldehyde, acetaldehyde, formic acid, acetic acid, nitrous acid, and sulfurous acid. Another object to be pursued beside the above is a reduction in the manufacturing cost, which is a challenge that sound absorbing materials and sub-mufflers commonly face.

The inventors of the present invention have found out that a basalt continuous fiber with an excellent heat resistance can be produced by selecting the melting conditions of a basalt raw stone. At the same time, the inventors have found out that the crystallization; and the sticking can be curbed and the heat resistance can be significantly improved by selecting the oxides to be the network formers and the glass modifiers and by optimizing the amount of the added oxides. The present invention has been attained in this way.

Note that the basalt fiber for high temperature in the present invention is a basalt fiber in which the crystallization occurs little and only an allowable level of sticking phenomenon occurs even when the basalt fiber is exposed to a high-temperature exhaust gas at 750° C. to 900° C. for 200 hours or longer.

The present invention is an invention of a sub-muffler. In the sub-muffler, a perforated exhaust pipe is arranged inside the sub-muffler, and caps and an out pipe are arranged outside the perforated pipe. Sound absorbing materials are filled in the space between the perforated exhaust pipe, and the caps and the out pipe. The sub-muffler is characterized in that, among the sound absorbing materials, at least part of the sound absorbing material closer to the perforated pipe is a basalt fiber for high temperature.

The sub-muffler of the present invention includes the following typical structures (1) to (4).

(1) The basalt fiber for high temperature is filled in the entire space between the perforated exhaust pipe, and the caps and the out pipe.

(2) The sound absorbing material filled in the space between the perforated exhaust pipe, and the caps and the out pipe has a two-layer structure. The sound absorbing material layer closer to the perforated exhaust pipe is a layer of the basalt fiber for high temperature, and the sound absorbing material layer closer to the caps and the out pipe is a layer of the basalt fiber for low temperature.

(3) The sound absorbing material filled in the space between the perforated exhaust pipe, and the caps and the out pipe has a two-layer structure. The sound absorbing-material layer closer to the perforated exhaust pipe is a layer of the basalt fiber for high temperature, and the sound absorbing material layer closer to the caps and the out pipe is a layer of the fiberglass for low temperature.

(4) The sound absorbing material filled in the space between the perforated exhaust pipe, and the caps and the out pipe has a three-layer structure. The sound absorbing material layer closer to the perforated exhaust pipe is a layer of the basalt fiber for high temperature, and the sound absorbing material layer closer to the caps and the out pipe is a layer of the fiberglass, for low temperature. In addition, a layer of the basalt fiber for low temperature exists between the layer of the basalt fiber for high temperature layer and the layer of the fiberglass for low temperature.

As the basalt fiber for high temperature used in the present invention, a basalt continuous fiber is preferable, but basalt short fibers may also be used. In this case, the filament diameter of the basalt fiber for high temperature is preferably uniform, but the filament diameters of the basalt short fibers may vary.

In addition, the basalt fiber for high temperature may be provided by winding in a woven state, or may be provided by winding in an unwoven state.

Explanations will be given below of the basalt fiber for high temperature used in the sub-muffler of the present invention.

Firstly, the basalt fiber for high temperature used in the sub-muffler of the present invention is a basalt fiber obtained from a 100-wt % basalt stone for high temperature (A) with a $SiO_2$ content of approximately 55.9 wt % to 61.1 wt %.

Secondly, the basalt fiber for high temperature used in the sub-muffler of the present invention comprises two different types of basalt raw stone with different oxide compositions from each other. Here, the two different types of basalt raw stone are a basalt stone for high temperature (A) with a $SiO_2$ content of approximately 55.9 wt % to 61.1 wt %, and a basalt stone for low temperature (B) with a $SiO_2$ content of approximately 54.1 wt % to 58.1 wt %. Here; the mixing ratio (in percentage by weight) of the raw stone for high temperature (A) and the raw stone for low temperature (B) is in a range from (A) 50 wt %+(B) 50 wt % to (A) 95 wt %+(B) 5 wt %. A preferable mixing ratio is in a range from (A) 80 wt %+(B) 20 wt % to (A) 90 wt %+(B) 10 wt %.

Thirdly, the basalt fiber for high temperature used in the sub-muffler of the present invention is made by adding at least one kind of oxide selected from the group consisting of $Al_2O_3$, $SiO_2$, CaO and MgO to the basalt raw stone for low temperature (B). Here, the optimal amount of oxide added to the raw stone is one of the following (1) to (3).

(1) In the case of adding a single kind of oxide, the amount of oxide externally added to the basalt stone of 100 wt % is in a range from 1.0 wt % to 40 wt %, or preferably from 10 wt % to 30 wt %.

(2) In the case of adding two kinds of oxide, the total amount of oxide externally added to the basalt stone of 100 wt % is in a range from 1.0 wt % to 70 wt %, or preferably from 10 wt % to 60 wt %.

(3) In the case of adding three kinds of oxide, the total amount of oxide externally added to the basalt stone of 100 wt % is in a range from 1.0 wt % to 60 wt %, or preferably from 10 wt % to 50 wt %.

Fourthly, the basalt fiber for high temperature used in the sub-muffler of the present invention is characterized in that the basalt fiber is made from raw materials of two different kinds of basalt stone with oxide compositions different from each other. In addition, it is characterized in that at least one kind of oxide selected from the group consisting of $Al_2O_3$, $SiO_2$, CaO and MgO is added to the basalt stone. Here, as in the case of the third basalt fiber, the optimal amount of oxide added to the raw stone is one of the following (1) to (3).

(1) In the case of adding a single kind of oxide, the amount of oxide externally added to the basalt stone of 100 wt % is in a range from 1.0 wt % to 40 wt %, or preferably from 10 wt % to 30 wt %.

(2) In the case of adding two kinds of oxide, the total amount of oxide externally added to the basalt stone of 100 wt % is in a range from 1.0 wt % to 70 wt %, or preferably from 10 wt % to 60 wt %.

(3) In the case of adding three kinds of oxide, the total amount of oxide externally added to the basalt stone of 100 wt % is in a range from 1.0 wt % to 60 wt %, or preferably from 10 wt % to 50 wt %.

Fifthly, the basalt fiber for high temperature used in the sub-muffler of the present invention is made from raw materials of basalt stone and is manufactured by the following manufacturing process. The manufacturing process in general has a step of disintegrating the basalt stone and a step of washing the disintegrated basalt stone. In addition, in the case of the second basalt fiber for high temperature, the manufacturing process has a step of mixing the two kinds of basalt stone, and in the case of the third and the fourth basalt fibers for high temperatures, the manufacturing process has a step of mixing the raw stone and the additive oxide. Furthermore, the manufacturing process in general has a step of melting the basalt stone, the mixed raw stone, or the mixed raw material of the basalt stone and the oxide. Finally, the manufacturing process in general has a step of forming the molten material into fiber, and a step of doubling and winding the fiber. In addition, when the viscosity of the molten material is η, the log η decreases approximately in a linear fashion with temperature rise, down to a range from 2.55 (dPa·s) to 2.85 (dPa·s) at 1440° C., down to a range from 2.10 (dPa·s) to 2.45 (dPa·s) at 1540° C. and down to a range from 1.80 (dPa·s) to 2.10 (dPa·s) at 1640° C. The basalt fiber is manufactured with a log η of 2.15 (dPas) to 2.35 (dPas), or preferably, with a log η of 2.20 (dPa·s) to 2.30 (dPa·s). With these melting conditions, the filament diameter can be controlled, and the manufacturing of the basalt continuous fiber for high temperature that is not cut off at the steps of doubling and winding is made possible. As is mentioned above, the optimal temperature of the molten material should be selected so that the log η (η is the viscosity at a high temperature) of the molten material would be in a range from 2.15 (dPas) to 2.35 (dPas), or preferably in a range from 2.20 (dPa·s) to 2.30 (dPa·s).

The raw material of basalt stone is selected from the following two:

(1) a 100-wt % basalt stone for high temperature (A) with a higher content of $SiO_2$, and (2) a mixture of the basalt stone for high temperature (A) and the basalt stone for low temperature (B) with a lower content of $SiO_2$ than the basalt stone for high temperature (A).

In addition, at least one kind of oxide selected from the group consisting of $Al_2O_3$, $SiO_2$, CaO and MgO may be added to the raw material of basalt stone. In this case, the optimal amount of the added oxide is the following (1) to (3).

(1) In the case of adding a single kind of oxide, the amount of oxide externally added to the basalt stone of 100 wt % is in a range from 1.0 wt % to 40 wt %, or preferably from 10 wt % to 30 wt %.

(2) In the case of adding two kinds of oxide, the total amount of oxide externally added to the basalt stone of 100 wt % is in a range from 1.0 wt % to 70 wt %, or preferably from 10 wt % to 60 wt %.

(3) In the case of adding three kinds of oxide, the total amount of oxide externally added to the basalt stone of 100 wt % is in a range from 1.0 wt % to 60 wt %, or preferably from 10 wt % to 50 wt %.

The filament diameter can be controlled, at the above-mentioned step of forming fiber from the molten material, by adjusting the winding speed of the molten material formed into fiber. Note that the molten material to be formed into fiber is obtained by completely melting the raw material at a certain predetermined temperature, and then the complete molten material is dropped from the hole provided in the bottom of the platinum bushing The highly heat resistant and highly acid resistant basalt fiber used in the sub-muffler of the present invention is made from a raw material such as a basalt stone. The basalt fiber is preferably manufactured by a manufacturing apparatus of a basalt continuous fiber. The manufacturing apparatus includes a hopper, which the raw materials are put into. The raw material is prepared by grinding the basalt stone and then by washing the ground product. The manufacturing apparatus also includes a furnace where the washed product is melted by heating means. The manufacturing apparatus also includes a platinum bushing provided with multiple holes in the bottom for forming the molten material into fiber, and a winding machine for doubling and then winding the fiber.

In addition, the present invention is an automobile equipped with one of the sub-mufflers described above.

In the sub-muffler of the present invention, a highly heat resistant basalt fiber that can tolerate a temperature ranging from 750° C. to 900° C., or higher, is used as a sound absorbing material. The sub-muffler is capable of maintaining the durability and the sound absorbing performance even when the sub-muffler is used for a gasoline engine, a diesel engine, an engine of a flex fuel vehicle (FFV), and an engine of a hybrid vehicle (HV). In addition, the sub-muffler is capable of maintaining the durability and the sound absorbing performance, even when the sound absorbing material is exposed to a high-temperature exhaust gas at 650° C. to 900° C., or a corrosive gas constituents such as HC, $NO_x$, $SO_x$, formaldehyde, acetaldehyde, formic acid, acetic acid, nitrous acid, and sulfurous acid. Besides, the sub-muffler of the present invention has accomplished a reduction in the manufacturing cost, which is a challenge that sound absorbing materials and sub-mufflers commonly face.

In addition, the highly heat resistant basalt fiber used in the sub-muffler of the present invention is made from a raw material such as:

(1) a 100 wt % basalt stone for high temperature with a high $SiO_2$ content (A);

(2) a mixture of the basalt stone for high temperature (A) and the basalt stone for low temperature with a low $SiO_2$ content (B);

(3) the basalt stone for low temperature (B) with oxides to be the network formers and the glass modifiers while the kind of oxide to be added is optimally selected and the amount of the added oxides is also optimized; and (4) the mixture (2) with oxides to be the network formers and the glass modifiers while the kind of oxide to be added is optimally selected and the amount of the added oxides is also optimized.

Use of these raw materials curbs the crystallization and the sticking of the basalt fiber, and improves significantly the heat resistance of the basalt fiber. Control of the filament diameter of the highly heat resistant basalt fiber used in the sub-muffler of the present invention can be made possible by controlling the melting conditions at the manufacturing process of the highly heat resistant basalt fiber. As a result, it is made possible to manufacture a basalt continuous fiber that is not cut off at the step of winding.

DETAILED DESCRIPTION OF THE PREFERRED EMBODIMENT

A basalt stone (basalt raw stone), which is a raw material of the basalt fiber of the present invention, is a kind of igneous rock. Its principal constituent minerals are (1) plagioclase: $Na(AlSi_3O_8)$—$Ca(Al_2SiO_8)$, and (2) pyroxene: (Ca, Mg, $Fe^{2+}$, $Fe^{3+}$, Al, Ti)$_2$[(Si, Al)$_2O_6$] (3) olivine: (Fe, Mg)$_2SiO_4$. Ukraine produces an inexpensive and high-quality basalt stone.

Tables 1 and 2 below show examples of the elemental ratio (wt %) and the composition ratio based on oxide (wt %) of (1) a basalt stone for high temperature (A), (2) a basalt stone for low temperature (B) and (3) a mixed raw stone of a 85% raw stone (A) and a 15% raw stone (B). The ratios are obtained by ICP analysis (by a high-frequency plasma emission spectrometer, specifically, ICPV-8100 from Shirnadzu Co.). Note that, in the following explanations, the compositions of the various basalt raw stones and those of the basalt fibers obtained by use of the raw stones are considered approximately the same, within measurement error.

Note that the ICP analysis has a difficulty in measuring the amount of oxygen, so that the total amount of elements is not 100%. Table 2 shows the converted ratio taking the oxygen, which is difficult to be detected by the ICP analysis, into consideration.

TABLE 1

| | Basalt raw stone for high temperature (A) (wt %) | Basalt raw stone for low temperature (B) (wt %) | Basalt raw stone for high temperature (A) 85 wt % Basalt raw stone for low temperature (B) 15 wt % (wt %) |
|---|---|---|---|
| Si | 23.6-28.7 | 23.5-28.5 | 25.1-28.7 |
| Fe | 6.07-6.54 | 6.24-6.84 | 5.88-6.60 |
| Al | 8.75-9.24 | 8.50-9.00 | 8.95-9.38 |
| Ca | 4.10-4.44 | 5.71-6.03 | 4.33-4.64 |
| Na | 2.15-2.24 | 1.85-1.95 | 2.06-2.23 |
| K | 1.54-1.73 | 1.27-1.47 | 1.53-1.77 |
| Mg | 1.34-1.49 | 2.68-2.82 | 1.55-1.65 |
| Ti | 0.49-0.52 | 0.57-0.61 | 0.50-0.55 |
| Mn | 0.12-0.15 | 0.11-0.15 | 0.13-0.14 |
| P | 0.09-0.09 | 0.07-0.07 | 0.08-0.09 |
| Zr | 0.02-0.03 | 0.02-0.03 | 0.02-0.19 |
| Ba | 0.04-0.04 | 0.04-0.04 | 0.04-0.09 |
| Sr | 0.03-0.03 | 0.03-0.03 | 0.03-0.03 |
| B | 0.03-0.07 | 0.01-0.05 | 0.02-0.06 |
| Cr | 0.01-0.02 | 0.01-0.02 | 0.01-0.02 |
| S | 0.01-0.01 | 0.01-0.01 | 0.01-0.01 |

TABLE 2

| | Basalt raw stone for high temperature (A) (wt %) | Basalt raw stone for low temperature (B) (wt %) | Basalt raw stone for high temperature (A) 85 wt % Basalt raw stone for low temperature (B) 15 wt % (wt %) |
|---|---|---|---|
| $SiO_2$ | 55.9-61.1 | 54.1-58.1 | 56.4-60.4 |
| $FeO + Fe_2O_3$ | 8.10-9.39 | 8.23-9.53 | 7.89-9.28 |
| $Al_2O_3$ | 16.2-18.6 | 15.0-18.0 | 16.6-18.4 |
| CaO | 5.64-6.54 | 7.68-8.68 | 5.93-6.72 |
| $Na_2O$ | 2.94-3.17 | 2.35-2.75 | 2.71-3.01 |

TABLE 2-continued

|  | Basalt raw stone for high temperature (A) (wt %) | Basalt raw stone for low temperature (B) (wt %) | Basalt raw stone for high temperature (A) 85 wt % Basalt raw stone for low temperature (B) 15 wt % (wt %) |
|---|---|---|---|
| $K_2O$ | 1.92-2.05 | 1.54-1.69 | 1.91-2.09 |
| MgO | 0.31-2.57 | 1.55-4.75 | 2.49-2.78 |
| $TiO_2$ | 0.81-0.92 | 0.89-1.04 | 0.83-0.95 |
| MnO | 0.15-0.22 | 0.15-0.22 | 0.16-0.19 |
| $P_2O_5$ | 0.20-0.23 | 0.14-0.22 | 0.18-0.21 |
| $ZrO_2$ | 0.03-0.03 | 0.03-0.03 | 0.03-0.25 |
| BaO | 0.05-0.05 | 0.03-0.05 | 0.05-0.09 |
| SrO | 0.03-0.04 | 0.03-0.05 | 0.04-0.04 |
| $B_2O_3$ | 0.11-0.22 | 0.05-0.15 | 0.06-0.19 |
| $Cr_2O_3$ | 0.01-0.03 | 0.01-0.03 | 0.01-0.03 |
| SO | 0.01-0.02 | 0.01-0.02 | 0.01-0.02 |

Figure 1:
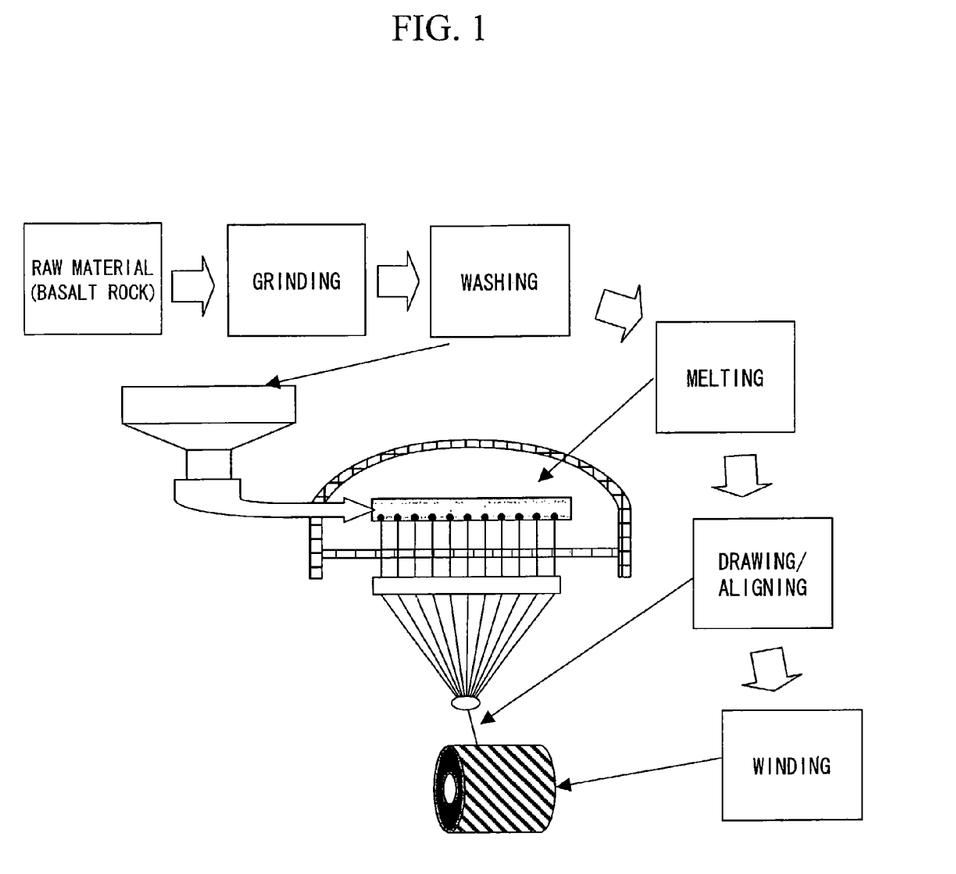
FIG. 1 illustrates schematically every step of the manufacturing process of a basalt continuous fiber of the present invention.

FIG. 1 schematically shows every step of manufacturing the basalt continuous fiber of the present invention. Firstly, as is shown in FIG. 1, the basalt stone to be the raw material is ground to a certain predetermined particle size. Secondly, the ground product is washed, and then is put into a raw material input hopper of a melting furnace. The melting furnace is a gas furnace and/or an electric furnace, and is surrounded by refractory lining. The raw material in the furnace is heated with a burner onto the surface and is melted. The molten material is extruded through a platinum bushing that has multiple holes in the bottom to be formed into fiber. The basalt thus formed into fiber is doubled and wound by a fiber winder.

FIG. 1 also shows a schematic diagram of an apparatus for manufacturing the basalt continuous fiber used in the present invention. Some characteristics of the melting furnace of this manufacturing apparatus are as follows.

(1) Each of its furnaces is independent of another.
(2) A bushing is provided for each furnace.
(3) It is construed as a batch furnace, solely carrying out the whole process from the basalt stone input port, via the furnace and the bushing, and then to the winder.

Use of this apparatus has the following advantage.

(1) Modification of the furnace can be done by stopping just a specific part of the production. This leads to another advantage. For example, use of a plurality of furnaces makes it possible to modify each furnace on a regular basis while the production is continued by other furnaces.
(2) The apparatus can respond to small lot production. Furthermore, production can be done by using different raw materials.

The basalt stone raw material is made to be a complete molten material in the electric or gas furnace at a certain predetermined temperature. This molten material is pulled out from the bottom of the platinum bushing at a certain predetermined speed to be formed into a continuous fiber with a filament diameter of a level of several micrometers to several tens of micrometers. Particularly, when the continuous fiber is used as a sound absorbing material, it is preferable that the filament diameter be 10 µm to 20 µm. Factors in controlling the filament diameter of the basalt continuous fiber include the composition of the molten material, the temperature of the molten material, the viscosity at a certain predetermined high temperature of the molten material, the size of each hole provided in the bottom of the platinum bushing, and the form of each hole and the arrangement of the holes. Beside, there is another important factor, namely, the tension at the time of forming fiber. Ordinarily, the tension is controlled by the winding speed, that is, the rotation speed, of the fiber winder shown in the schematic diagram of FIG. 1. In addition, in order to manufacture a continuous fiber, it is essential that the fiber is not cut off during the winding. In order to prevent the fiber from being cut off, it is important to optimize the above-mentioned determining factors of the filament diameter. As has been described above, the point in the present invention is to produce a continuous fiber, without being cut off, with a filament diameter of several micrometers to several tens of micrometers.

The key technique of the method of manufacturing basalt continuous fiber using basalt stone system raw material is the controls of the temperature and the viscosity of the molten material. It is essential to carry out the measuring of the viscosity of the molten material at a high temperature. It is also essential to carry out the control so that the optimal viscosity could be obtained in response to each composition of raw materials.

Examples of the present invention will be given below.

The high-temperature viscosity of molten material is measured by the glass viscosity measurement (by sample drawdown method). According to the principle of sample drawdown method, when a Pt ball moves at a constant velocity in molten glass, the viscosity is obtained by Stokes' Law with the following equation:

$$\eta = GW/v$$

where G represents an apparatus constant, W represents a load, and v represents a movement velocity of a Pt crucible.

Example 1

Figure 2:
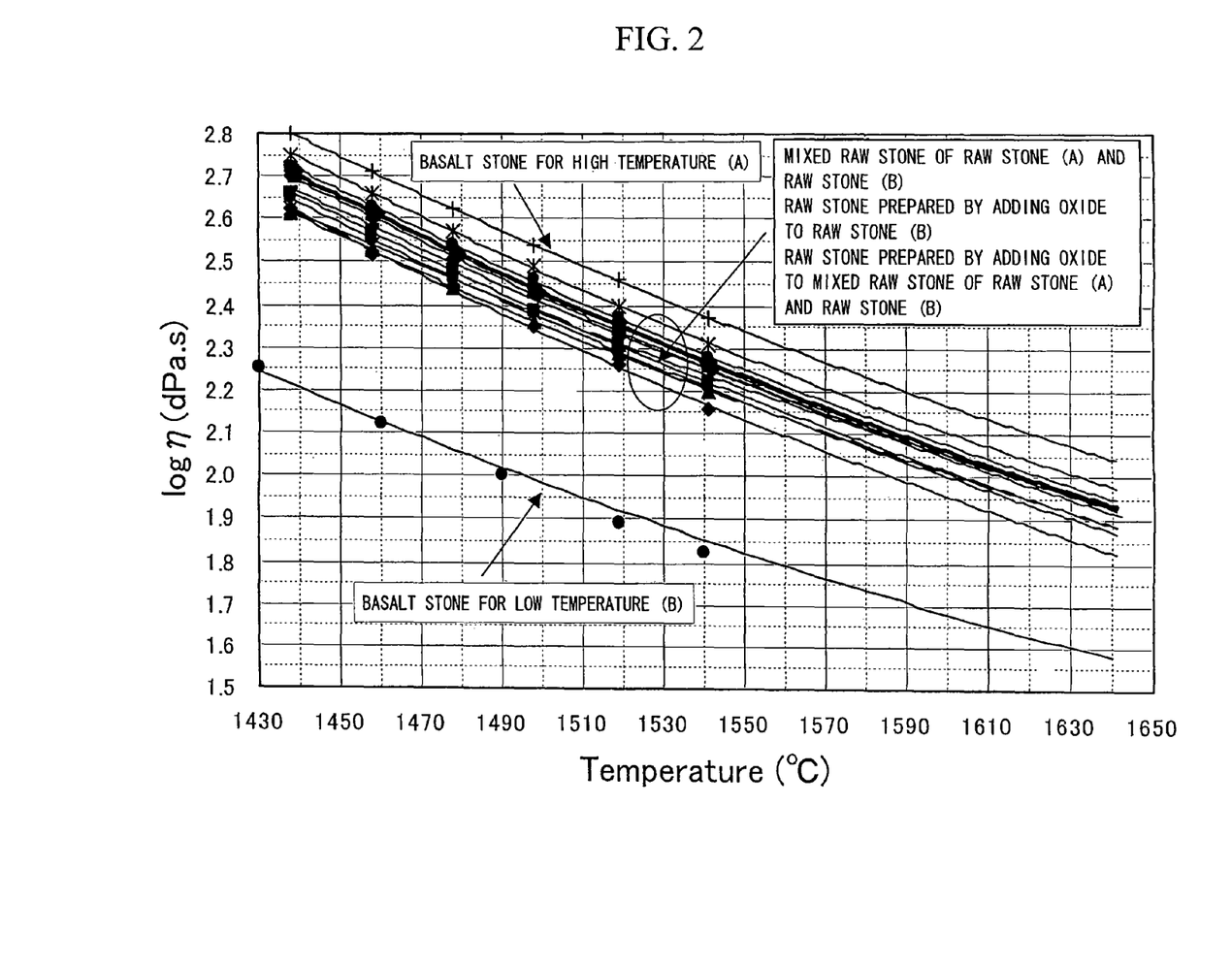
FIG. 2 illustrates the viscosity at a high temperature ranging from 1430° C. to 1640° C. of various basalt raw stones obtained by a method of the present invention.

FIG. 2 shows high-temperature viscosities of various raw stones related to the present invention in a temperature range between 1430° C. and 1640° C. Note that, due to the performance limitation of the measurement apparatus, the viscosity at a temperature of 1550° C. or higher cannot be measured. For this reason, the graph is shown by extrapolated lines. In every raw stone, the value of log η tends to decrease approximately linearly as the temperature rises. Use of the high-temperature viscosity data thus obtained made it possible to select the optimal melting temperature for manufacturing highly heat resistant basalt continuous fiber from each of the raw stones. Use of the optimal temperature made it possible to obtain a basalt fiber with a desired filament diameter from each of the raw stones, without causing any cut-off.

Figure 3:
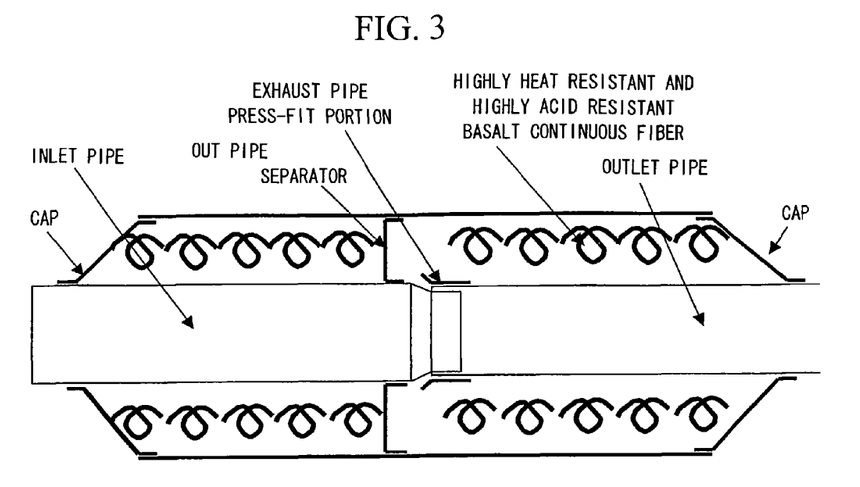
FIG. 3 illustrates a sectional view of a sub-muffler with the basalt continuous fiber for high temperature of the present invention used as a sound absorbing material.

Subsequently, determination of presence or absence of the crystalline phase and the glassy phase in basalt fibers was carried out by an X-ray powder diffraction method in the following way. Tested basalt fibers were obtained from (1) the basalt raw stone for high temperature (A) and from (2) a mixed raw stone of the basalt raw stone for high temperature (A) and the basalt raw stone for low temperature (B). The basalt fibers thus obtained were subjected to a heat treatment at 800° C., 850° C. or 900° C. for 50 hours to 200 hours in the atmosphere. FIG. 3 shows the results of the determination. In the table:

A represents a state in which only glassy phase is present;
B represents a state in which much glassy phase and little crystalline phase are present;
C represents a state in which little glassy phase and much crystalline phase are present; and
D represents a state in which only crystalline phase is present.

Note that A means the highest heat resistance, and each of B, C and D means a decreased heat resistance in this order. A heat resistance at B-level is sufficient.

TABLE 3

|  | Basalt raw stone for high temperature (A) 100 wt % | Basalt raw stone for high temperature (A) 80 wt % Basalt raw stone for low temperature (B) 20 wt % | Basalt raw stone for high temperature (A) 85 wt % Basalt raw stone for low temperature (B) 15 wt % |
|---|---|---|---|
| Fiberization | A | A | A |
| 800° C. × 200 hr | B | B | B |
| 850° C. × 200 hr | B | B | B |
| 900° C. × 200 hr | B | B | B |

The results shown in FIG. 3 indicate the following.

(1) In the basalt fiber made from only the basalt raw stone for high temperature (A) had a lot of glassy phase after the heat treatment at 800° C. to 900° C. for 200 hours. In other words, this basalt fiber was a highly heat resistant basalt fiber.

(2) Among the basalt fibers made from mixed raw stones of the basalt raw stone for high temperature (A) and the basalt raw stone for low temperature (B), one made from a mixture of the 80 wt % basalt raw stone (A) and 20 wt % basalt raw stone (B), as well as one made from a mixture of the 85 wt % basalt raw stone (A) and 15 wt % basalt raw stone (B), had a lot of glassy phase after the heat treatment at 800° C. to 900° C. for 200 hours. In other words, these basalt fibers were highly heat resistant basalt fibers.

Example 2

Determination of presence or absence of the crystalline phase and the glassy phase in basalt fibers was carried out by the X-ray powder diffraction method in the following way. Vitrified samples were prepared by mixing the basalt raw stone for low temperature (B) ground in a mortar and various oxides in a ball mill for 12 hours and then heating the resultant mixture in a platinum-lined alumina crucible at 1430° C. for 4 hours followed by an annealing process. These vitrified samples were subjected to heat treatment at 800° C., 850° C. or 900° C. for 50 hours or 200 hours and then the determination was carried out.

Tables 4 to 9 show the results of the determination. As in Table 3, in these tables:

A represents a state in which only glassy phase is present;

B represents a state in which much glassy phase and little crystalline phase are present;

C represents a state in which little glassy phase and much crystalline phase are present; and D represents a state in which only crystalline phase is present.

Note that A means the highest heat resistance, and each of B, C and D means a decreased heat resistance in this order. B-level heat resistance is sufficient.

TABLE 4

|  | Basalt raw stone for low temperature | Basalt raw stone for low temperature (B) + $TiO_2$ | | |
|---|---|---|---|---|
|  | (B) only | 2 wt % | 5 wt % | 10 wt % |
| Vitrification | A | B | B | C |
| 800° C. × 50 Hr | C | C | C | C |
| 850° C. × 50 Hr | C | C | C | C |
| 900° C. × 50 Hr | C | C | C | C |

TABLE 5

|  | Basalt raw stone for low temperature | Basalt raw stone for low temperature (B) + $Na_2O$ | | |
|---|---|---|---|---|
|  | (B) only | 2 wt % | 5 wt % | 10 wt % |
| Vitrification | A | A | A | A |
| 800° C. × 50 Hr | C | C | C | C |
| 850° C. × 50 Hr | C | C | C | C |
| 900° C. × 50 Hr | C | C | C | C |

TABLE 6

|  | Basalt raw stone for low temperature | Basalt raw stone for low temperature (B) + $SiO_2$ | | |
|---|---|---|---|---|
|  | (B) only | 2 wt % | 5 wt % | 10 wt % |
| Vitrification | A | A | A | A |
| 800° C. × 200 Hr | C | B | B | B |
| 850° C. × 200 Hr | C | B | B | B |
| 900° C. × 200 Hr | C | B | C | C |

TABLE 7

|  | Basalt raw stone for low temperature | Basalt raw stone for low temperature (B) + $Al_2O_3$ | | |
|---|---|---|---|---|
|  | (B) only | 2 wt % | 5 wt % | 10 wt % |
| Vitrification | A | A | A | C |
| 800° C. × 200 Hr | C | B | B | C |
| 850° C. × 200 Hr | C | B | B | C |
| 900° C. × 200 Hr | C | B | B | C |

TABLE 8

|  | Basalt raw stone for low temperature | Basalt raw stone for low temperature (B) + CaO | | |
|---|---|---|---|---|
|  | (B) only | 2 wt % | 5 wt % | 10 wt % |
| Vitrification | A | A | A | A |
| 800° C. × 200 Hr | C | B | B | C |
| 850° C. × 200 Hr | C | D | D | D |
| 900° C. × 200 Hr | C | D | D | D |

TABLE 9

|  | Basalt raw stone for low temperature | Basalt raw stone for low-temperature (B) + MgO | | |
|---|---|---|---|---|
|  | (B) only | 2 wt % | 5 wt % | 10 wt % |
| Vitrification | A | A | B | D |
| 800° C. × 50 Hr | C | C | C | D |
| 850° C. × 50 Hr | C | C | D | D |
| 900° C. × 50 Hr | C | C | D | D |

The results shown in Tables 4 to 9 indicate the following.

(1) Addition of $TiO_2$ did not cause vitrification. The addition did not curb the crystallization which took place after the heat treatment.

(2) Addition of $Na_2O$ (in the experiment, $Na_2CO_3$ was added) did not curb the crystallization which took place after the heat treatment.

(3) Addition of $SiO_2$ curbed the generation of the crystalline phase as the added amount increased, though crystalline phase was observed.

(4) Addition of $Al_2O_3$ curbed the crystallization more effectively as the added amount increased. Excessive addition, however, made the vitrification difficult.

(5) Addition of CaO curbed the crystallization in the case of the 800° C. heat treatment. In the case of 850° C. or higher heat treatment, however, the crystallization progressed fast.

(6) Addition of MgO did not curb the crystallization. Furthermore, excessive addition made the crystallization difficult.

Example 3

Vitrified samples were prepared by mixing the basalt raw stone for low temperature (B) disintegrated by a crusher and various oxides in an agate mortar and then heating the resultant mixture in a platinum-lined alumina crucible at 1430° C. for 4 hours followed by an annealing process.

Subsequently, these samples were subjected to heat treatment at 800° C., 850° C. or 900° C. for 50 hours to 200 hours. After that, determination of presence or absence of the crystalline phase and the glassy phase was carried out by the X-ray powder diffraction method.

Tables 10 to 12 show the results of the determination. In these tables, symbols A to D represent the same as those in the tables above. Symbols A and B indicate excellent heat resistance and suitability for practical use.

TABLE 10

|  | Basalt raw stone for low temperature | Basalt raw stone for low temperature (B) + $SiO_2$ 20 wt % | |
| --- | --- | --- | --- |
|  | (B) only | CaO 10 wt % | MgO 10 wt % |
| Vitrification | A | A | A |
| 800° C. × 200 Hr | C | A | B |
| 850° C. × 200 Hr | C | C | C |
| 900° C. × 200 Hr | C | C | C |

TABLE 11

|  | Basalt raw stone for low temperature | Basalt raw stone for low temperature (B) + $Al_2O_3$ 20 wt % | |
| --- | --- | --- | --- |
|  | (B) only | CaO 10 wt % | MgO 10 wt % |
| Vitrification | A | D | C |
| 800° C. × 200 Hr | C | D | C |
| 850° C. × 200 Hr | C | D | D |
| 900° C. × 200 Hr | C | D | D |

The results shown in Tables 10 to 12 indicate the following.

(1) Addition of $SiO_2/Al_2O_3$ system perfectly curbed the crystallization in the case of the heat treatment at 800° C. for 200 hours. Furthermore, in the case of the heat treatment at 850° C. for 200 hours and in the case of the heat treatment at 900° C. for 200 hours; glassy phase remained a lot, meaning that the generation of the crystalline phase was curbed.

(2) Addition of $SiO_2$/CaO system perfectly curbed the crystallization in the case of the heat treatment at 800° C. for 200 hours. The crystallization, however, was not curbed in the case of the heat treatment at 850° C. for 200 hours. It was not curbed in the case of the heat treatment at 900° C. for 200 hours, either.

(3) Addition of $SiO_2$/MgO system tended to curb the crystallization in the case of the heat treatment at 800° C. for 200 hours. The crystallization, however, was not curbed in the case of the heat treatment at 850° C. for 200 hours. It was not curbed in the case of the heat treatment at 900° C. for 200 hours, either.

(4) Addition of $Al_2O_3$/MgO system did not cause vitrification. The addition did not curb the crystallization.

(5) Addition of $Al_2O_3$/CaO system did not cause vitrification. The addition did not curb the crystallization.

These results reveal that the two-constituent oxide systems with an effect of curbing the crystallization of the basalt raw stone after heat treatment, that is, an effect of improving the heat resistance were as follows in an order of effectiveness: $SiO_2$:20 wt %/$Al_2O_3$:20 wt %>. $SiO_2$/CaO system>$SiO_2$/MgO system>$Al_2O_3$:20 wt %/MgO system>$Al_2O_3$:20 wt %/CaO system. Particularly, addition of $SiO_2$:20 wt %/$Al_2O_3$:20 wt % significantly improved the heat resistance of the basalt fiber from the current approximately 750° C. to a level ranging from 850° C. to 900° C.

Example 4

Vitrified samples were prepared by mixing the basalt raw stone for low temperature (B) disintegrated by a crusher and three kinds of oxides of $SiO_2$i, $Al_2O_3$ and MgO in an agate mortar and then heating the resultant mixture in a platinum-lined alumina crucible at 1430° C. for 4 hours followed by an annealing process.

Subsequently, these samples were subjected to heat treatment at 800° C., 850° C. or 900° C. for 50 hours to 200 hours. After that, determination of presence or absence of the crystalline phase and the glassy phase was carried out by the X-ray powder diffraction method.

Table 13 shows the results of the determination. In the table, symbols A to D represent the same as those in the tables above. Symbols A and B indicate excellent heat resistance and suitability for practical use.

TABLE 12

|  | Basalt raw stone for low temperature (B) only | Basalt raw stone for low temperature (B) + $SiO_2$ 10 wt % + $Al_2O_3$ 20 wt % | Basalt raw stone for low temperature (B) + $SiO_2$ 20 wt % + $Al_2O_3$ 20 wt % | Basalt raw stone for low temperature (B) + $SiO_2$ 15 wt % + $Al_2O_3$ 25 wt % | Basalt raw stone for low temperature (B) + $SiO_2$ 13 wt % + $Al_2O_3$ 27 wt % |
| --- | --- | --- | --- | --- | --- |
| Vitrification | A | A | A | B | B |
| 800° C. × 200 Hr | C | B | A | B | B |
| 850° C. × 200 Hr | C | B | B | C | C |
| 900° C. × 200 Hr | C | C | B | C | D |

TABLE 13

|  | Basalt raw stone for low temperature (B) only | Basalt raw stone for low temperature (B) SiO$_2$ 10 wt % Al$_2$O$_3$ 20 wt % MgO 10 wt % | Basalt raw stone for low temperature (B) SiO$_2$ 20 wt % Al$_2$O$_3$ 20 wt % MgO 10 wt % | Basalt raw stone for low temperature (B) SiO$_2$ 30 wt % Al$_2$O$_3$ 20 wt % MgO 10 wt % |
|---|---|---|---|---|
| Vitrification | A | A | A | A |
| 800° C. × 200 Hr | C | B | A | A |
| 850° C. × 200 Hr | C | D | D | D |
| 900° C. × 200 Hr | C | D | D | D |

The results shown in Table 13 indicate the following. Addition of the three kinds of oxide, SiO$_2$/Al$_2$O$_3$/MgO, in every composition, had an effect of curbing the crystallization in the case of the heat treatment at 800° C. No effect of curbing the crystallization, however, was shown in the cases of the heat treatments at 850° C. or higher.

Example 5

Vitrified samples were prepared by mixing the basalt raw stone for high temperature (A) and the basalt raw stone for low temperature (B), having been ground in a mortar, in a ball mill for 12 hours and then heating the resultant mixture in a platinum-lined alumina crucible at 1430° C. for 4 hours followed by an annealing process.

Subsequently, these samples were subjected to heat treatment at 800° C., 850° C. or 900° C. for 50 hours to 200 hours. After that, determination of presence or absence of the crystalline phase and the glassy phase was carried out by the X-ray powder diffraction method.

Table 14 shows the results of the determination. In the table, symbols A to D represent the same as those in the tables above. Symbols A and B indicate excellent heat resistance and suitability for practical use.

TABLE 14

|  | Basalt raw stone for low temperature 30 wt % + basalt raw stone for high temperature 70 wt % | Basalt raw stone for low temperature 20 wt % + basalt raw stone for high temperature 80 wt % | Basalt raw stone for low temperature 10 wt % + basalt raw stone for high temperature 90 wt % |
|---|---|---|---|
| 800° C. × 200 Hr | B | B | B |
| 850° C. × 200 Hr | B | B | B |
| 900° C. × 200 Hr | B | B | B |

The results shown in Table 14 indicate that the use of a raw material including two kinds of basalt raw stone with element contents different from each other made the glassy phase remain a lot. It is also indicated that the use curbed the generation of the crystalline phase in the cases of heat treatment at 800° C. for 200 hours, at 850° C. for 200 hours, and at 900° C. for 200 hours. Note that the two kinds of basalt raw stone were, specifically, the basalt raw stone for high temperature (A) with a SiO$_2$ content of approximately 57 wt % to 61 wt % and the basalt raw stone for low temperature (B) with a SiO$_2$ content of approximately 54 wt % to 58 wt %.

Example 6

Vitrified samples were prepared by mixing the basalt raw stone for high temperature (A) disintegrated by a crusher and Al$_2$O$_3$ as an oxide in an agate mortar and then heating the resultant mixture in a platinum-lined alumina crucible at 1430° C. for 4 hours followed by an annealing process.

Subsequently, these samples were subjected to heat treatment at 800° C., 850° C. or 900° C. for 50 hours to 200 hours. After that, determination of presence or absence of the crystalline phase and the glassy phase was carried out by the X-ray powder diffraction method.

Table 15 shows the results of the determination. In the table, symbols A to D represent the same as those in the tables above. Symbols A and B indicate excellent heat resistance and suitability for practical use.

TABLE 15

| | Basalt raw stone | | | | | | | |
|---|---|---|---|---|---|---|---|---|
| | Basalt raw stone for high temperature (A) 100 wt % | | | | | | | |
| Al$_2$O$_3$ (wt %) | 0 | 7.5 | 10.0 | 12.5 | 15.0 | 17.5 | 20 | 30 |
| 800° C. × 200 Hr | B | B | B | B | B | B | B | C |
| 850° C. × 200 Hr | B | B | B | B | B | B | B | C |
| 900° C. × 200 Hr | B | B | B | B | B | B | B | C |

The results shown in Table 15 indicate that, also in the case of the basalt raw stone for high temperature (A), addition of the oxide made the glassy phase remain a lot. It is also indicated that addition of a particular amount of oxide curbed the generation of the crystalline phase in the cases of heat treatment at 800° C. for 200 hours, at 850° C. for 200 hours, and at 900° C. for 200 hours.

Example 7

Using the manufacturing apparatus of the continuous fiber shown in FIG. 1, continuous fibers were manufactured from various raw materials of basalt stone system. The basalt stones used as the raw materials were:

(1) the basalt raw stone for high temperature (A);

(2) the basalt raw stone for low temperature (B);

(3) basalt stone raw materials with the basalt raw stone for low temperature (B) respectively with oxide of one constituent system, two constituent system and three constituent system being added to;

(4) a mixed basalt stone raw material with the basalt raw stone for high temperature (A) and the basalt raw stone for low temperature (B); and (5) a raw material of a mixed basalt stone of the basalt raw stone for high temperature (A) and the basalt raw stone for low temperature (B) with another oxide added thereto.

These raw materials are put into the hopper and then are melted in a gas furnace in which the temperature is kept constant at a certain predetermined temperature. The size of the basalt stone may be several millimeters to several tens of millimeters or may be μm to several millimeters. It is necessary that the input rate of the raw material and output rate of the fiber taken out from the platinum bushing be kept constant, and thus, the liquid level of the molten material be always kept constant. Refractory lining of the furnace may vary in composition, but it is necessary to use materials which react less with the molten material, and which are corroded less by the molten material. In a case where a mixed raw material is used, the mixed raw material may be prepared by a preceding mixing process. Alternatively, each constituent of the mixed raw material may be inputted separately by a plurality of hoppers so that the mixed raw material would have a certain predetermined composition.

According to the observation of the appearance and the form of the obtained fiber, the continuous fiber was brownish, which was clearly distinct from the white color of the synthetic fiberglass.

Examples

Sub-Mufflers Using Highly Heat Resistant and Highly Acid Resistant Basalt Fiber as Sound-Deadening Material In the following Examples of sub-mufflers, when exposure to a high temperature at 750° C. to 800° C. for 200 hours or longer causes little crystallization and an allowable level of sticking phenomenon in a basalt fiber, the basalt fiber is defined to be "intermediately heat resistant." When exposure to a higher temperature at 800° C. to 900° C. renders the same result, the basalt fiber is defined to be "highly heat resistant." When exposure to the above-mentioned various organic and inorganic acids in the exhaust gas at a high temperature ranging from 700° C. to 900° C. causes an allowable level of corrosion in a basalt fiber, the basalt fiber is defined to be "highly acid resistant."

The following is a method of manufacturing sub-mufflers with configurations of Examples 8 to 12 to be described later. The outlet pipe is pressed into the inlet pipe, and then a sound absorbing material of various configurations is uniformly wound around the pipes. Generally, a continuous fiber is wound around the pipes in several layers. To wind the sound absorbing material around the inlet and the outlet pipes with a radially uniform thickness, it is preferable to apply a certain predetermined tension to the continuous fiber while the sound absorbing material is being winded. Once the thickness of the fibrous sound absorbing material has reached a certain predetermined one, an organic binder is applied to the outer circumference to fasten the sound absorbing material. Subsequently, a separator, and an inlet-pipe-side cap and an outlet-pipe-side cap are fastened to the inlet pipe and the outlet pipe. Furthermore, an out pipe is fastened onto the peripheries of the separator and the caps by a method, for example, by riveting, by welding, or by another method.

Example 8

Figure 8:
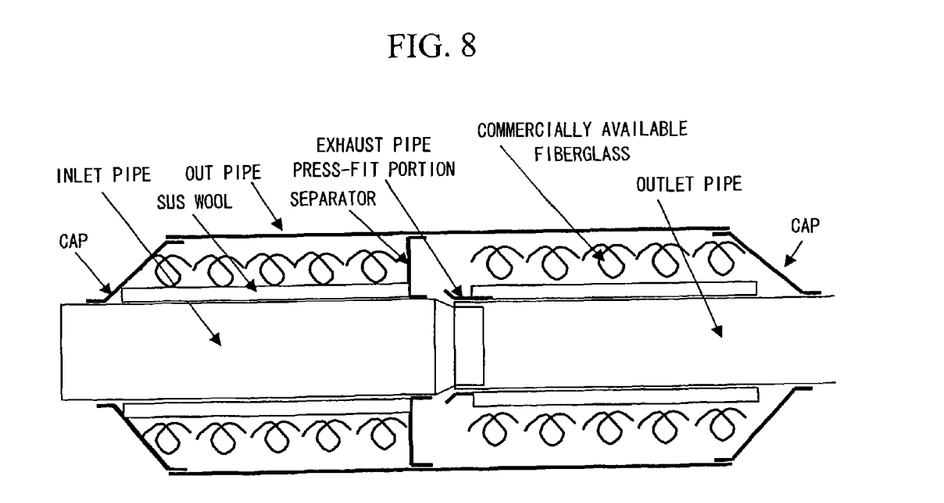
FIG. 8 illustrates a sectional view of a sub-muffler using a conventional SUS.

Sub-Muffler with Highly Heat Resistant and Highly Acid Resistant Basalt Continuous Fiber as a Sound Absorbing Material As is shown in FIG. 3, the sub-muffler is configured of an inlet pipe, an outlet pipe, a separator, caps and an out pipe. The sub-muffler has a structure in which a highly heat resistant and highly acid resistant basalt continuous fiber made from basalt stone raw materials in various compositions is wound around the inlet/outlet pipes, and is filled in the space between the inlet/outlet pipes and the out pipe. The sub-muffler of the present invention can be used for a gasoline engine, a diesel engine, an engine for flex fuel vehicle (FFV, for example, gasoline/ethanol vehicle), and an engine for hybrid vehicle (HV). Furthermore, a sub-muffler with a conventional structure includes steel used stainless (SUS) wool as shown in FIG. 8. The sub-muffler with the structure of the present invention, however, eliminates the SUS wool in the conventional sub-muffler. As a result, the manufacturing process can be simplified and the sub-muffler can be made 20% to 40% lighter in weight than the conventional one.

Example 9

Sub-Muffler Using Sound Absorbing Material with Two-Layer Structure

Figure 4:
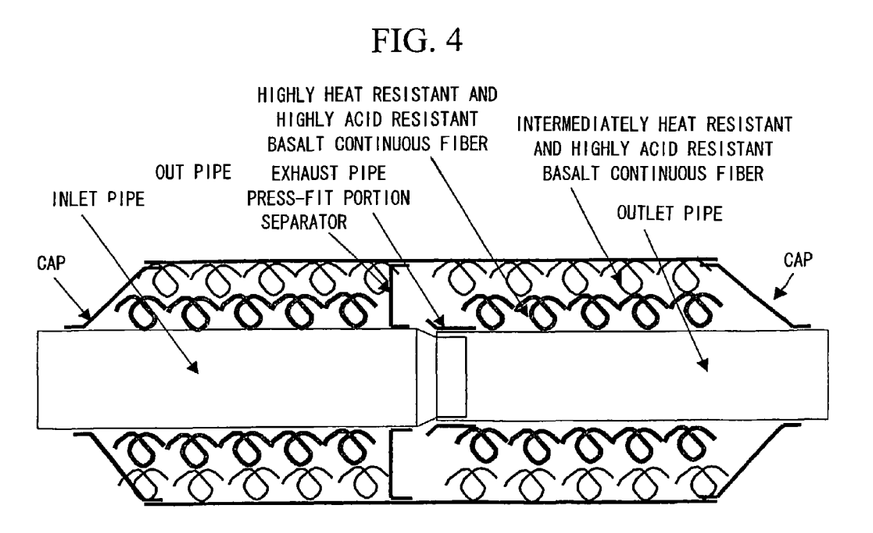
FIG. 4 illustrates a sectional view of a sub-muffler using a sound absorbing material with a two-layer structure of the present invention.

The sub-muffler of this Example 9 has the same structure as that of Example 8 and is used for the same engines as those of Example 8. As is shown in FIG. 4, however, in the sub-muffler of this Example 9, the basalt continuous fiber used as the sound absorbing material is formed of two layers, which are an inner layer of the highly heat resistant basalt continuous fiber and an outer layer of the intermediately heat resistant basalt continuous fiber. In this structure, the basalt continuous fiber used for the inner layer is expensive, but for the outer layer, a less expensive basalt continuous fiber is used. As a result, the sub-muffler of this Example 9 can be made as light as that of Example 8. In addition, the sub-muffler of this Example 9 can be manufactured at a lower cost than otherwise.

Example 10

Figure 5:
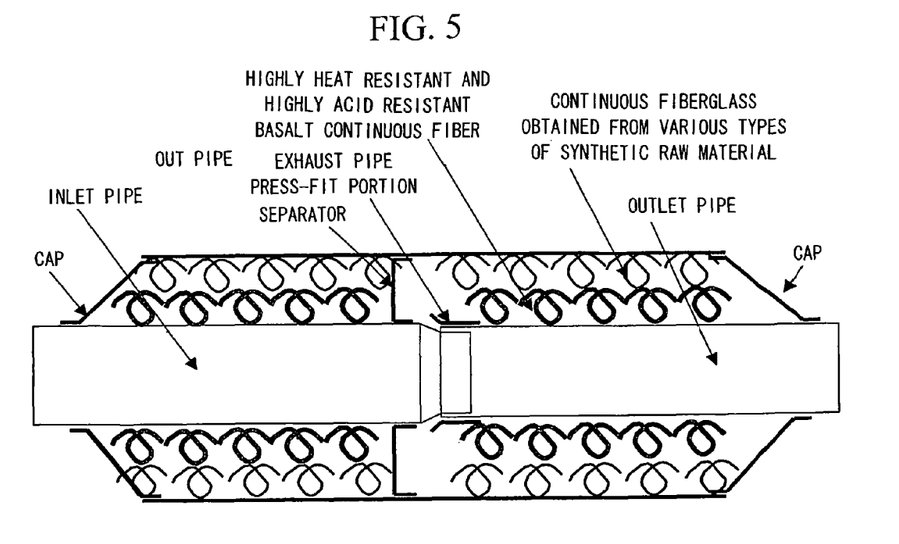
FIG. 5 illustrates a sectional view of a sub-muffler using a sound absorbing material with a two-layer structure consisting of a layer of the basalt continuous fiber of the present invention and a layer of a continuous fiberglass obtained from a synthetic raw material.

Sub-Muffler Using Sound Absorbing Material with Two-Layer Structure of Basalt Continuous Fiber and Continuous Fiberglass Obtained from a Synthetic Raw Material The sub-muffler of this Example 10 has the same structure as that of Example 8, and is used for the same engines as those of Example 8. As is shown in FIG. 5, however, in the sub-muffler of this Example 10, the sound absorbing material is configured of an inner layer and an outer layer. The inner layer is a layer of the highly heat resistant and highly acid resistant basalt continuous fiber, and the outer layer is a layer of a continuous fiberglass obtained from a synthetic raw material such as $SiO_2$—$Al_2O_3$—$CaO$ system, $SiO_2$—$Al_2O_3$—$CaO$—$Na_2O$ system, $SiO_2$—$CaO$—$Na_2O$ system, $SiO_2$—$Na_2O$ system and $SiO_2$—$K_2O$ system. In this structure, the fiberglass used for the outer layer is less expensive, so that the sub-muffler of this Example 10 can be manufactured at a lower cost than the sub-muffler with the structure of Example 8.

Example 11

Figure 6:
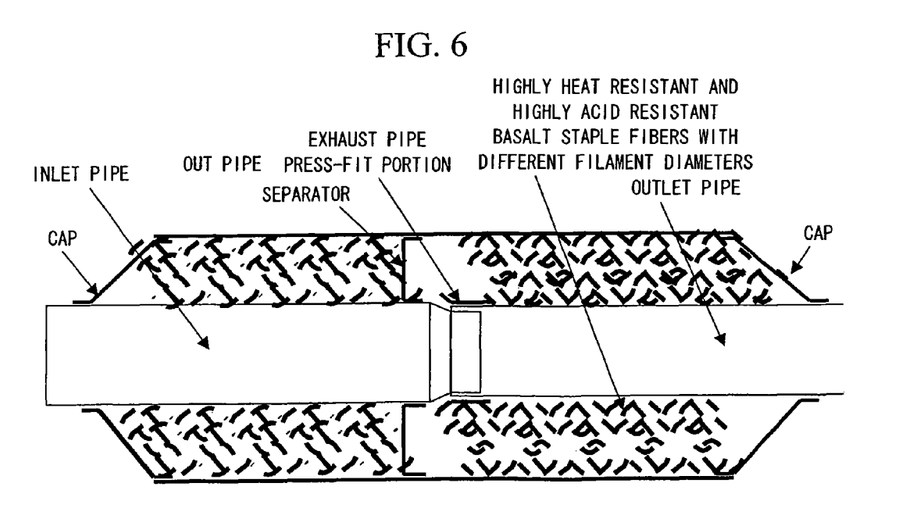
FIG. 6 illustrates a sectional view of a sub-muffler using the sound absorbing material of the present invention formed of basalt short fibers with filament diameters different from one another.

Sub-Muffler Using Sound Absorbing Materials of Basalt Short Fibers with Different Filament Diameters The sub-muffler of this Example 11 has the same structure as that of Example 8, and is used for the same engines as those of Example 8. As is shown in FIG. 6, however, the sub-muffler of this Example 11 has a structure in which the sound absorbing material wound-around the pipes is a basalt continuous fiber with a filament diameter of one or more of the following ranges: between 1 μm and 5 μm, between 5 μm and 10 μm, between 10 μm and 20 μm, and between 20 μm and 50 μm. In the structure of the sub-muffler of this Example 12, a chopped basalt fiber with a filament diameter mentioned-above and with a length of 5 mm to 1000 mm can also be used. In the manufacturing process of a basalt continuous fiber, what is normally obtained is a continuous fiber, but sometimes the fiber is cut off, or a basalt fiber with different filament diameter is obtained, at the time of the manufacture. Use of these fibers as the sound absorbing material can make the production yield 100%. This can lower the manufacturing cost.

Example 12

Sub-Muffler Using Sound Absorbing Material with Three-Layer Structure

Figure 7:
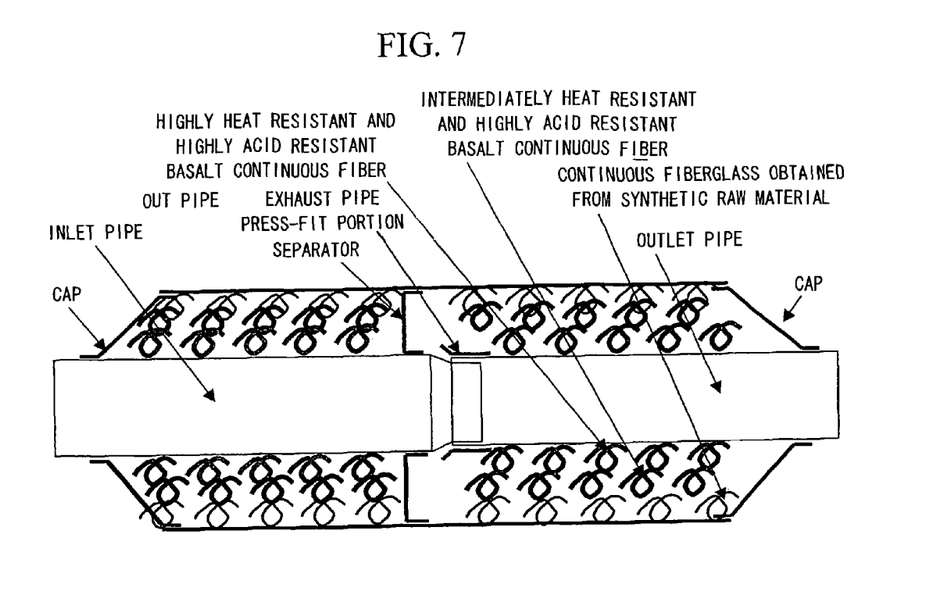
FIG. 7 illustrates a sectional view of a sub-muffler using the sound absorbing material of the present invention with a three-layer structure.

The sub-muffler of this Example 12 has the same structure as that of Example 8, and is used for the same engines as those of Example 8. As is shown in FIG. 7, however, the sound absorbing material has a three-layer structure. In the structure, the inner layer is the highly heat resistant basalt continuous fiber, the middle layer is the intermediately heat resistant basalt continuous fiber, and the outer layer is a continuous fiberglass obtained from a synthetic raw material, such as $SiO_2$—$Al_2O_3$—$CaO$ system, $SiO_2$—$Al_2O_3$—$CaO$—$Na_2O$ system, $SiO_2$—$CaO$—$Na_2O$ system, $SiO_2$—$Na_2O$ system, and $SiO_2$—$K_2O$ system. Thanks to the three-layer structure, the sub-muffler of this structure can be manufactured at a cost even lower than the sub-muffler with the structure of Example 9.

The sub-muffler of the present invention uses the basalt fiber for high temperature as the sound absorbing material. As a result, the sub-muffler needs no heat resistant material such as SUS and the sub-muffler can keep its durability and sound absorbing performance even when exposed to various corrosive components in the exhaust gas. Besides, the sub-muffler of the present invention has accomplished a reduction in the manufacturing cost, which is a challenge that sound absorbing materials and sub-mufflers commonly face.

The invention claimed is:

1. A sub-muffler comprising:
a perforated exhaust pipe arranged inside the sub-muffler;
caps arranged outside the perforated exhaust pipe;
an out pipe arranged outside the perforated exhaust pipe; and
a sound absorbing material filled in a space between the perforated exhaust pipe, and the caps and the out pipe,
wherein at least part of the sound absorbing material, which is closer to the perforated pipe, is a basalt fiber for high temperature,
the sound absorbing material filled in the space between the perforated exhaust pipe, and the caps and the out pipe has a two-layer structure; and
the sound absorbing material layer closer to the caps and the out pipe is a layer of a basalt fiber for low temperature,
the basalt fiber for high temperature is composed of $SiO_2$: 55.9-61.1, $FeO+Fe_2O_3$: 8.10-9.39, $Al_2O_3$: 16.2-18.6, CaO: 5.64-6.54, $Na_2O$: 2.94-3.17, $K_2O$: 1.92-2.05, MgO: 0.31-2.57, $TiO_2$: 0.81-0.92, MnO: 0.15-0.22, $P_2O_5$: 0.20-0.23, $ZrO_2$: 0.03-0.03, BaO: 0.05-0.05, SrO: 0.03-0.04, $B_2O_3$: 0.11-0.22, $Cr_2O_3$: 0.01-0.03 and SO: 0.01-0.2 wt %, and
the basalt fiber for low temperature is composed of $SiO_2$: 54.1-58.1, $FeO+Fe_2O_3$: 8.23-9.53, $Al_2O_3$: 15.0-18.0, CaO: 7.68-8.68, $Na_2O$: 2.35-2.75, $K_2O$: 1.54-1.69, MgO: 1.55-4.75, $TiO_2$: 0.89-1.04, MnO: 0.15-0.22, $P_2O_5$: 0.14-0.22, $ZrO_2$: 0.03-0.03, BaO: 0.03-0.05, SrO: 0.03-0.05, $B_2O_3$: 0.05-0.15, $Cr_2O_3$: 0.01-0.03 and SO: 0.01-0.2 wt %.

2. The sub-muffler as recited in claim 1, wherein the basalt fiber for high temperature is a basalt continuous fiber.

3. The sub-muffler as recited in claim 1, wherein the basalt fiber for high temperature is basalt short fibers with filament diameters different from one another.

4. The sub-muffler as recited in any one of claims 1 and 2, wherein the basalt fiber for high temperature is woven, and provided by winding.

5. The sub-muffler as recited in any one of claims 1, 2 and 3, wherein the basalt fiber for high temperature is not woven, and provided by winding.

6. The sub-muffler as recited in any one of claims 1, 2 and 3, wherein the basalt fiber for high temperature is made from a basalt raw stone for low temperature with one or more kinds of oxide selected from the group consisting of $Al_2O_3$, $SiO_2$, CaO and MgO being added thereto.

7. The sub-muffler as recited in any one of claims 1, 2 and 3, wherein
(1) the basalt fiber for high temperature is formed into fiber using a raw material of a basalt raw stone for high temperature (A) which has more $SiO_2$ content, and, in the basalt stone raw material, log η (η is the viscosity at a high temperature of the basalt stone raw material) changes approximately linearly from 2.75 to 2.85 at 1440° C. and from 2.30 to 2.40 at 1540° C.; and
(2) the basalt fiber for high temperature is formed into fiber using a basalt stone raw material selected from mixtures of the basalt raw stone for high temperature (A) and a basalt raw stone for low temperature (B) which has less $SiO_2$ content, and in the basalt stone raw material, log η (η is the viscosity at a high temperature of the basalt stone raw material) changes approximately linearly from 2.55 to 2.75 at 1440° C. and from 2.10 to 2.35 at 1540° C.

8. The sub-muffler as recited in claim 7, wherein
one or more kinds of oxide selected from the group consisting of $Al_2O_3SiO_2$, CaO and MgO is added to the basalt raw stone for low temperature (B).

9. The sub-muffler as recited in claim 7, wherein
while η is the viscosity at a high temperature of the molten material of the basalt stone raw material, log η changes approximately linearly from 2.4 to 2.75 at 1440° C. and from 2.0 to 2.5 at 1540° C.

10. The sub-muffler as recited in claim 7, wherein
the added oxide has one constituent, and
the oxide is externally added in 1 wt % to 40 wt % to the basalt raw stone (B) of 100 wt %.

11. The sub-muffler as recited in claim 7, wherein
the oxide has two constituents, and
the oxide in total is externally added in 1 wt % to 70 wt % to the basalt raw stone (B) of 100 wt %.

12. The sub-muffler as recited in claim 7, wherein
the oxide has three or more constituents, and
the oxide in total is externally added in 1 wt % to 60 wt % to the basalt raw stone (B) of 100 wt %.

13. The sub-muffler as recited in any one of claims 1, 2, and 3, wherein
the perforated exhaust pipe is configured of an inlet pipe and an outlet pipe, one of which is pressed into the other.

14. The sub-muffler as recited in any one of claims 1, 2, and 3, wherein
the space formed by the caps and the out pipe, and the perforated exhaust pipe, which is configured of the inlet pipe and the outlet pipe, one being pressed into the other, is separated into an inlet pipe side and an outlet pipe side by a separator.

15. An automobile comprising the sub-muffler as recited in any one of claims 1, 2, and 3.

\* \* \* \* \*